(12) United States Patent
Ochi

(10) Patent No.: US 6,244,216 B1
(45) Date of Patent: Jun. 12, 2001

(54) SHEET FOR PET EXCRETION

(75) Inventor: Kengo Ochi, Tokyo (JP)

(73) Assignee: Uni-Heartous Corporation, Tokyo (JP)

( * ) Notice: Subject to any disclaimer, the term of this patent is extended or adjusted under 35 U.S.C. 154(b) by 0 days.

(21) Appl. No.: 09/409,970

(22) Filed: Sep. 30, 1999

(51) Int. Cl.$^7$ .................................................. A01K 29/00
(52) U.S. Cl. ............................................ 119/171; 119/169
(58) Field of Search ................................ 119/161, 169, 119/171, 172; 604/378, 381

(56) References Cited

U.S. PATENT DOCUMENTS

| | | | | |
|---|---|---|---|---|
| 4,537,148 | * | 8/1985 | Lowe, Jr. ............................. | 119/171 |
| 5,085,174 | * | 2/1992 | Etkin .................................... | 119/169 |
| 5,797,347 | * | 8/1998 | Ochi ..................................... | 119/169 |
| 5,843,067 | * | 12/1998 | Trombetta et al. .................. | 604/378 |
| 6,019,062 | * | 5/2000 | Lombard et al. .................... | 119/172 |
| 6,066,121 | * | 5/2000 | Lindquist et al. ................... | 604/381 |
| 6,101,978 | * | 8/2000 | Steckel ................................ | 119/171 |

FOREIGN PATENT DOCUMENTS 8-317740    12/1996   (JP) .

* cited by examiner

*Primary Examiner*—Charles T. Jordan
*Assistant Examiner*—Elizabeth Shaw
(74) *Attorney, Agent, or Firm*—Darby & Darby

(57) ABSTRACT

A sheet for pet excretion including a liquid permeable front face sheet, a liquid impermeable rear face sheet and an absorbent body interposed between the front face sheet and the rear face sheet. A liquid absorbent region where the absorbent body exists has a colored portion positioned at the center thereof and a non-colored portion adjoining the colored portion so as to enclose a whole periphery of the colored portion.

4 Claims, 4 Drawing Sheets

SHEET FOR PET EXCRETION

FIELD OF THE INVENTION

The present invention relates to a sheet for pet excretion used being laid on a floor or the like in order to treat excrements of a pet kept in an interior or the like and, more particularly, to the sheet for pet excretion capable of absorbing the excrements of the pet without a leak.

BACKGROUND OF THE INVENTION

A sheet for pet excretion has found wide use in treating the excrements of the pet kept in a home. FIG. 6(A) is a perspective view of a conventional sheet for pet excretion, and FIG. 6(B) is a sectional view thereof. A sheet S for pet excretion, as shown in FIGS. 6(A) and 6(B), comprises a front face sheet 1 such as liquid permeable nonwoven fabric, a liquid impermeable rear face sheet 2, and an absorbent body 3 interposed between the front face sheet 1 and the rear face sheet 2. The absorbent body 3 consists of an absorbent core 3a and absorbent papers 3b, 3c, such as tissue papers, covering an absorbent core 3a so as to sandwich its upper and lower surfaces therebetween. The absorbent core 3a is composed, for example, of a crushed pulp 4 and a super absorbent polymer (SAP) 5.

A portion where the absorbent body 3 is provided is a liquid absorbent region Sa capable of absorbing the excrements such as urine. In its periphery, there are bonded the front face sheet 1 and the rear face sheet 2 by a hot melt adhesive, thermally welding or the like, to provide a bonded portion Sb.

In the conventional sheet S for pet excretion, for example, the absorbent paper 3b is colored blue. Therefore, in the sheet S for pet excretion shown in FIG. 6(A), it is adapted such that the whole of the liquid absorbent region Sa appears blue through the front face sheet 1.

If a pet such as dog for instance has been trained in its childhood so as to excrete on a sheet colored blue or the like, thereafter it learns to excrete on the sheet colored blue or the like.

When a whole range of the liquid absorbent region Sa is colored blue or the like, as shown in FIG. 6(A) and FIG. 6(B), the pet learns to mount on the colored liquid absorbent region Sa and excrete thereon. However, on this occasion, the pet's nates portion is positioned close to an end part of the liquid absorbent region Sa, so that the pet is liable to excrete on the end part of the liquid absorbent region Sa. Accordingly, the excrement such as urine is liable to leak from the liquid absorbent region Sa to thereby soil a floor surface or the like.

Further, as shown in FIG. 6(B), in the conventional sheet S for pet excretion, the absorbent body 3 is flat. In such a structure, part of urine which remains unabsorbed by the absorbent body 3 is liable to flow toward the floor surface, from the end part of the liquid absorbent region Sa.

SUMMARY OF THE INVENTION

The present invention is to solve the aforementioned problems in the prior art, and has an object to provide a sheet for pet excretion, in which when a pet recognizes a colored region and excretes thereon, the urine or the like is surely absorbed in a liquid absorbent region to thereby prevent it from leaking toward a floor surface or the like.

The invention provides a sheet for pet excretion comprising a liquid permeable front face sheet, a liquid impermeable rear face sheet and an absorbent body interposed between the front face sheet and the rear face sheet, wherein a liquid absorbent region where the absorbent body exists has a colored portion positioned at the center thereof and a non-colored portion adjoining the colored portion so as to enclose a whole periphery of the colored portion.

In the above, it is preferable that the absorbent body comprises a first absorbent body which is colored and a second absorbent body which is non-colored, and the second absorbent body is overlaid on an outer periphery portion of the first absorbent body.

In this case, it is preferable that the front face sheet and the first absorbent body are pressure-molded at least at the colored portion of the liquid absorbent region, to thereby form a step on the front face sheet at a boundary part between the first absorbent body and the second absorbent body.

Moreover, it is preferable that the first absorbent body is composed of an absorbent core and an absorbent paper covering a surface of the absorbent core, and at least one of the absorbent core and the absorbent paper is colored, thereby making it possible to see the color through the front face sheet.

The term "non-colored" as used in the invention means a color inherent in a raw material constituting the sheet for pet excretion, i.e., a white color, an off white color or a color similar thereto. For example, pulp fibers to be used for the sheet for pet excretion become white by the fact that a purity of cellulose constituting the pulp fibers is enhanced by purification or bleaching.

On the other hand, the term "colored" as used in the invention means the fact that it is not non-colored. That is, it is a color other than the white color and produced by adding a pigment or a dye to the color inherent in a raw material. As to a kind of the colors in the colored portion of the invention, it is possible to use a blue color, a pink color or any optional color.

If a pet such as dog has been trained in its childhood so as to excrete on a sheet colored blue or the like, it learns to have such a habit as to always excrete on the sheet colored blue or the like.

In the invention, the liquid absorbent region where the absorbent body exists is colored only at the central portion to have a predetermined area and is non-colored at the remaining portion enclosing an outer periphery of the colored portion. Therefore, as a result that the pet thus trained recognizes the colored portion and excretes thereon, even in case where an urine or the like is excreted on an end part of the colored portion, it is possible to prevent the urine or the like from leaking outside the sheet for pet excretion. Since the non-colored portion of the liquid absorbent region exists outside the colored portion, the urine or the like excreted on the non-colored portion or the end part of the colored portion is absorbed by the absorbent body in the non-colored portion of the liquid absorbent region.

Especially, if the absorbent body comprises a first absorbent body which is colored and a second absorbent body which is non-colored and the second absorbent body is overlaid on an outer periphery portion of the first absorbent body, the urine or the like excreted on an end part of the colored portion is absorbed by both of the first absorbent body and the second absorbent body, so that the urine or the like is prevented from leaking outside the sheet.

Further, if the front face sheet and the first absorbent body are pressure-molded at the colored portion of the liquid absorbent region, to thereby form a step at a boundary part between the first absorbent body and the second absorbent body, it follows that a bank is formed in such a manner that the non-colored portion of the liquid absorbent region swells up while having the step around the colored portion. Therefore, the urine or the like excreted on an end part of the colored portion becomes further difficult to leak outside the sheet.

As a concrete method for forming the colored potion in the liquid absorbent region, there is a method of coloring liquid absorbent fibers such as pulp forming the absorbent core, a super absorbent polymer contained in the absorbent core, or an absorbent paper such as tissue paper provided on a surface of the absorbent core. Further, it may be possible to color an adhesive such as hot melt adhesive for bonding the absorbent body and the front face sheet together. Besides, it is also possible to color the front face sheet.

Further, it is also possible to form the sheet for pet excretion of the invention by providing a non-colored absorbent body in conformity with to the whole area of the liquid absorbent region, and interposing a colored tissue between the absorbent body and the front face sheet.

DETAILED DESCRIPTION OF THE INVENTION

Hereinafter, the invention is described with reference to the accompanying drawings.

Figure 1:
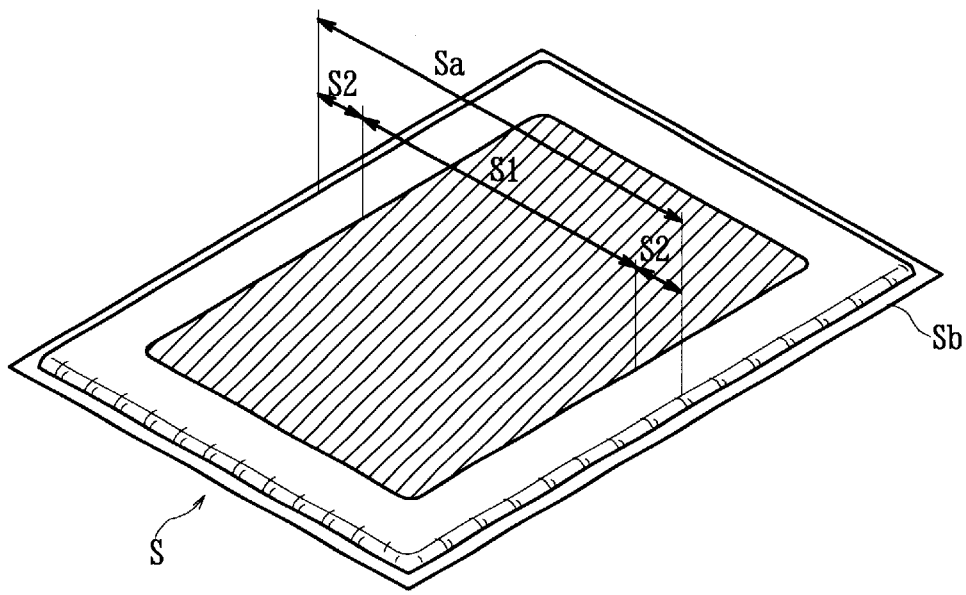
FIG. 1(A) and FIG. 1(B) are perspective views in which respectively a sheet for pet excretion of the invention is seen from above.
Figure 1:
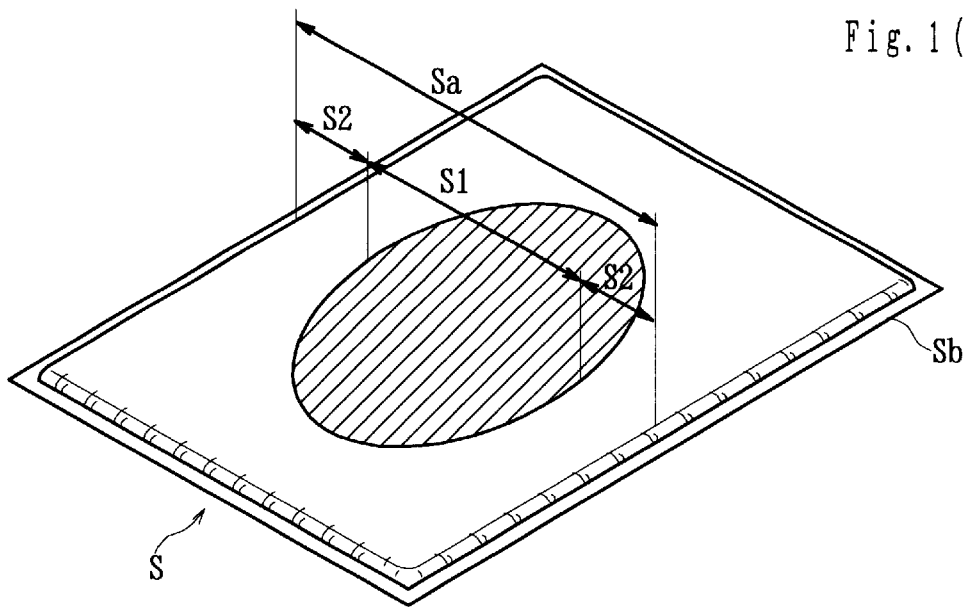
Figure 2:
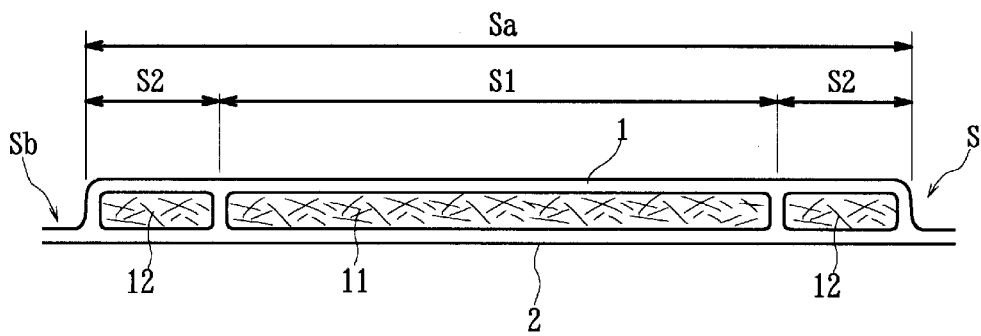
FIG. 2(A) and FIG. 2(B) are sectional views showing examples of a construction of the sheet for pet excretion of the invention.
Figure 2:
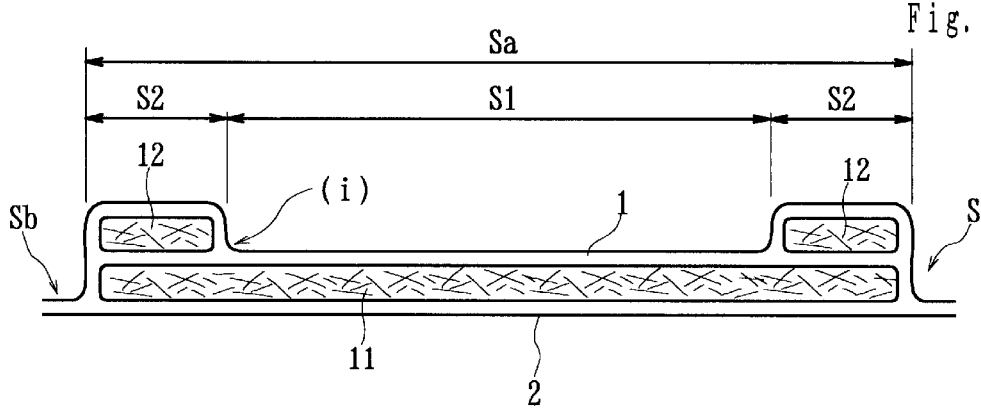
Figure 3:
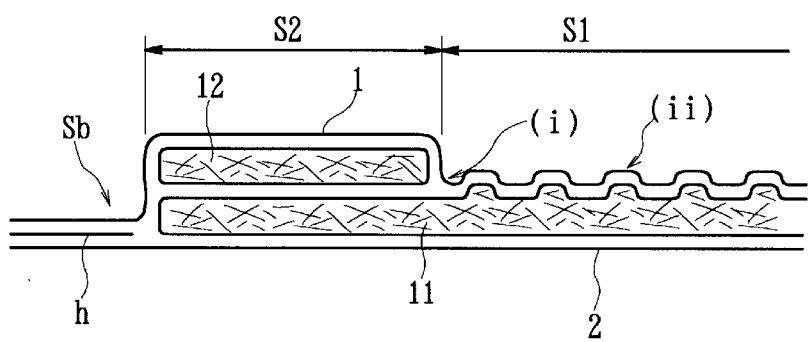
FIG. 3 is an enlarged sectional view of an end part of the sheet for pet excretion.

FIG. 1(A) and FIG. 1(B) are perspective views in which respectively a sheet S for pet excretion of the invention is seen from above, and FIG. 2(A), FIG. 2(B) and FIG. 3 are sectional views for constructions of the sheet S for pet excretion.

As shown in FIG. 1(A) and FIG. 1(B), in the sheet S for pet excretion of the invention, the whole excepting a bonded portion Sb positioned at a periphery of the sheet S for pet excretion is a liquid absorbent region Sa. Further, when the sheet S for pet excretion is seen from above, a central portion of the liquid absorbent region Sa is a colored portion S1, and a portion enclosing a whole periphery of the colored portion S1 is a non-colored portion S2. In this invention, the whole of the sheet S for pet excretion is in a rectangular shape, and the colored portion S1 is in a rectangular shape as shown in FIG. 1(A), or in an oval (elliptical) shape as shown in FIG. 1(B). Alternatively, the whole may be in a square shape, and the colored portion S1 may be in a square shape, a circular shape or the like.

FIG. 2(A) shows one example of a construction of the sheet S for pet excretion. As shown in FIG. 2(A), in the liquid absorbent region Sa, a second absorbent body 12 is provided so as to enclose an outer periphery of a first absorbent body 11. In this example, the first and second absorbent bodies 11 and 12 are disposed to share a common plane with each other i.e., to form a generally flat absorbent body conforming to the liquid absorbent region Sa, and on its front face there is laminated a liquid permeable front face sheet 1 and on its rear face there is laminated a liquid impermeable rear face sheet 2. In an outer periphery of the liquid absorbent region Sa, the front face sheet 1 and the rear face sheet 2 are bonded together by a hot melt type adhesive h (see FIG. 3) or a thermally welding, to thereby form the bonded portion Sb.

FIG. 2(B) shows another example of a construction of the sheet S for pet excretion. In the one shown in FIG. 2(B), between the front face sheet 1 and the rear face sheet 2, there is provided the first absorbent body 11 over an approximately whole area of the liquid absorbent region Sa. The second absorbent body 12 is overlaid on an outer periphery portion of the first absorbent body 11. Also in this case, at an outer periphery of a portion where the second absorbent body 12 is provided, the front face sheet 1 and the rear face sheet 2 are bonded together to thereby form the bonded portion Sb.

Figure 4:
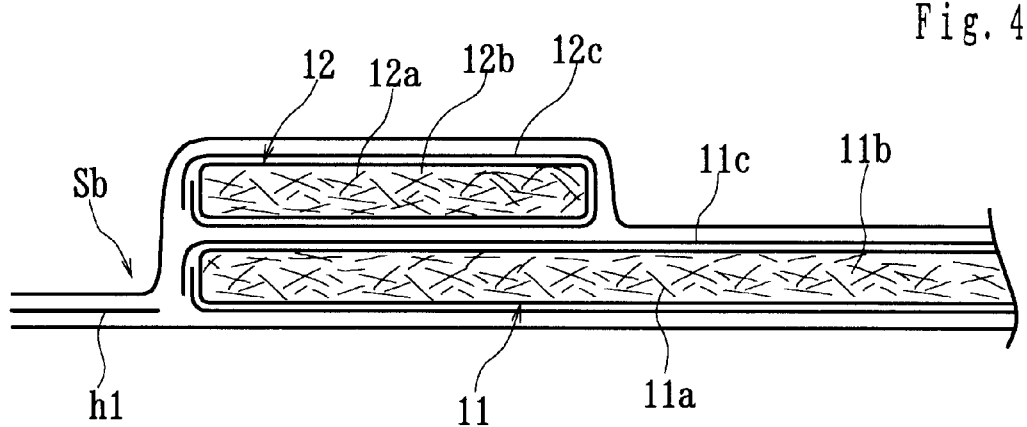
FIG. 4 is an enlarged sectional view showing a structure of an absorbent body in the sheet for pet excretion of the invention.

The front face sheet 1 is a point bond nonwoven fabric for instance. The point bond nonwoven fabric is formed from synthetic fibers such as polyethylene fibers, polypropylene fibers or composite fibers of these. Alternatively, the point bond nonwoven fabric may be formed from water-absorbent fibers such as rayon fibers and the above-mentioned synthetic fibers. In the sheet for pet excretion of the invention, it is indispensable that a pet can recognize the colored portion. Therefore, in case where the colored portion is formed by the absorbent body, the front face sheet is a sheet of such a thickness or shape that makes it possible to see the colored portion of the absorbent body therethrough. The liquid impermeable rear face sheet 2 is a polyethylene (PE) film or a vinyl sheet, or the like. As shown in FIG. 4 in an enlarged scale, the first absorbent body 11 is composed of an absorbent core containing absorbent fibers 11a such as crushed pulp and super absorbent polymers (SAPs) 11b, and an absorbent paper 11c such as tissue paper covering the absorbent core. Likewise, the second absorbent body 12 is constructed such that an absorbent core containing absorbent fibers 12a and super absorbent polymers (SAPs) 12b is covered with an absorbent paper 12c. The SAP can be made of polyacrylic acid, sodium polyacrylate, polyacrylamide, polyacrylonitrile, polyvinyl alcohol, an additional polymer of maleic anhydride, a polyether, a condensed polymer, a polysaccharide such as starch or cellulose, a protein such as collagen, or the like. Examples of the SAPs include: a cross-linked compound of sodium polyacrylate, a graft copolymer of starch having sodium polyacrylate or a graft copolymer of cellulose having polyacrylonitrile chains.

In these examples shown in FIGS. 2(A) and 2(B), the first absorbent body 11 is colored so as to exhibit a color such as blue when seen from a front face, and the second absorbent body 12 is not colored. Therefore, in the one shown in FIG. 2(A), a color of the first absorbent body 11 can be seen through the front face sheet 1, and a portion where the first absorbent body 11 is provided becomes the colored portion S1. On the other hand, since the second absorbent body 12 provided so as to enclose a periphery of the colored portion S1 is not colored, it becomes the non-colored portion S2, which exhibits a white color when seen from a front face.

In the one shown in FIG. 2(B), on the other hand, the second absorbent body 12 is overlaid on the outer periphery portion of the first absorbent body 11 thus colored. Therefore, a central portion where only the first absorbent body 11 is provided becomes the colored portion S1, which exhibits a color such as blue through the front face sheet 1, and the outer periphery portion where the first and second absorbent bodies 11 and 12 overlap becomes the non-colored portion S2, which exhibits a white color when seen from a front face.

In order to make it possible to see the first absorbent body 11 in a colored state through the front face sheet 1, it suffices to use a colored paper as the absorbent paper 11c covering the absorbent core. Alternatively, the absorbent fibers 11a such as pulp and/or the super absorbent polymers 11b constituting the absorbent core may be colored. As a method of coloring the absorbent fibers 11a, it is possible to spray a pigment such as phthalocyanine blue onto the absorbent fibers.

Figure 5:
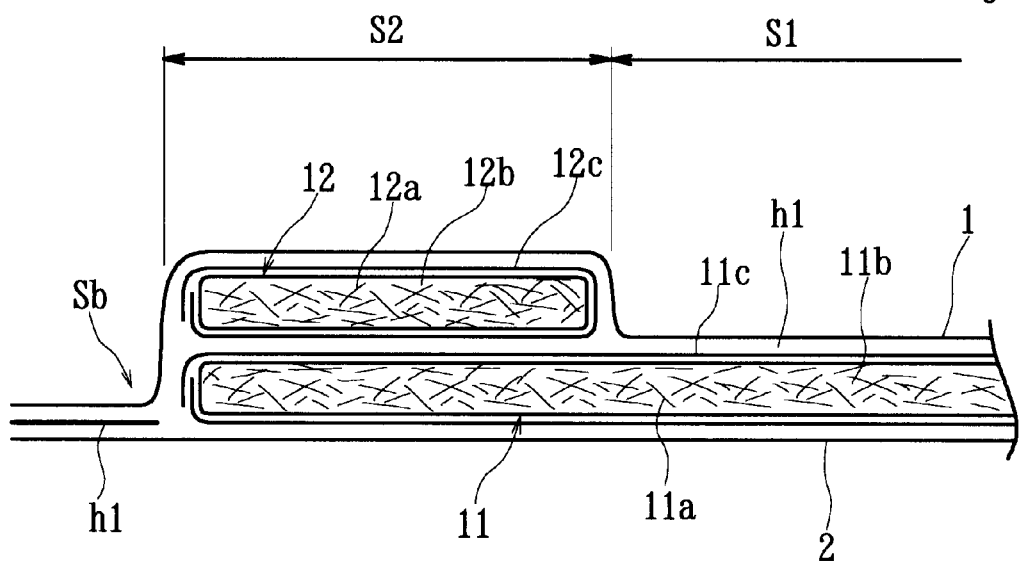
FIG. 5 is an enlarged sectional view showing a structure of an absorbent body in the sheet for pet excretion of the invention.

Alternatively, as shown in FIG. 5, a hot melt type adhesive h1 colored blue or the like may be interposed between the first absorbent body 11 and the front face sheet 1 to thereby form the colored portion S1.

With such a construction as mentioned above, the sheet S for pet excretion as shown in FIG. 1(A) and FIG. 1(B) can be obtained. That is, the colored portion S1 is formed at the center of the liquid absorbent region Sa, and the non-colored portion S2 is formed so as to enclose a periphery of the colored portion S1.

Further, in the one shown in FIG. 2(B), since a step (i) is formed in a boundary part between the first absorbent body 11 and the second absorbent body 12, this step (i) can prevent the urine or the like excreted on the colored portion S1 from flowing outside the sheet S. Here, if the front face sheet 1 and the first absorbent body 11 are pressure-molded in the colored portion S1 by using rollers or the like, it is possible to further clearly form the step (i) in the boundary part between the first absorbent body 11 and the second absorbent body 12. Moreover, by this pressure-molding, an embossing molding may be performed such that fine irregularities (ii) are continuously applied on surfaces of the first absorbent body 11 and the front face sheet 1, as shown in FIG. 3.

Since the step (i) is made clear by the pressure-molding, it is possible to dam up the urine excreted on an end part of the colored portion S1. Further, if the irregularities (ii) are formed on the first absorbent body 11 and the front face sheet 1 and the step (i) is clearly formed by the pressure-molding, it follows that when the pet mounts on the sheet S, the pet can recognize with its feet whether the mounted part is the colored portion S1 or the non-colored portion S2, so that it becomes easy to excrete in a range of the colored portion S1.

A method of using the sheet S for pet excretion is described.

Figure 6:
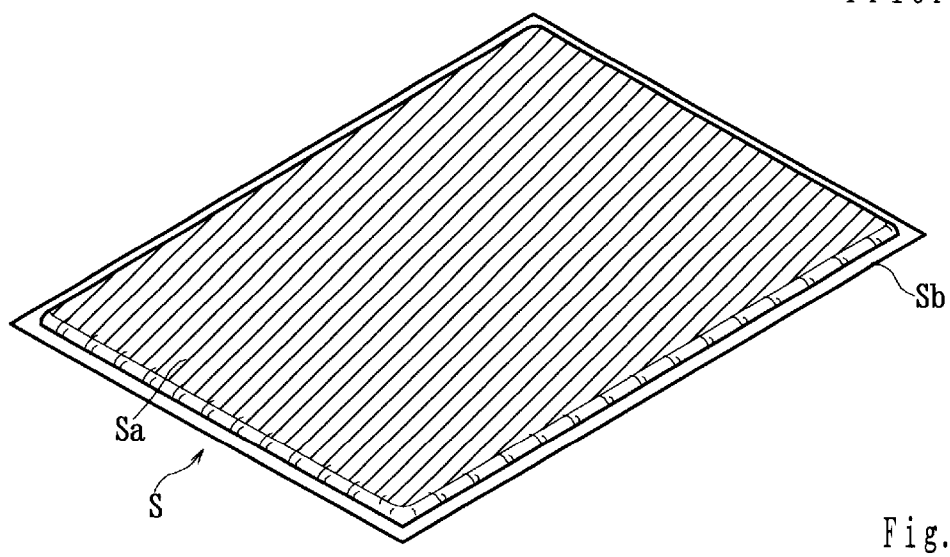
FIG. 6(A) is a perspective view of a conventional sheet for pet excretion.
FIG. 6(B) is a sectional view of the sheet shown in FIG. 6(A).
Figure 6:
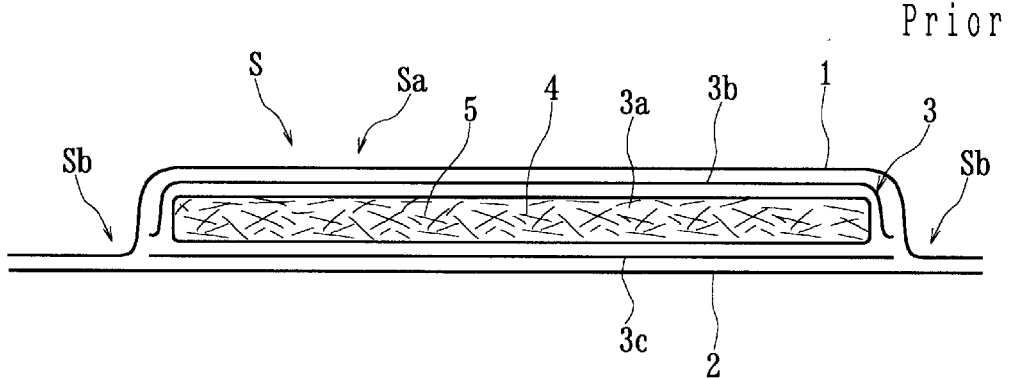

When a pet is in its childhood, such a sheet for pet excretion as shown in FIG. 6(A), in which a whole surface of the liquid absorbent region Sa is colored blue or the like, is laid on a floor or a toilet for pet and the pet is trained to excrete on the sheet for pet excretion, thereby causing the pet to memorize a place on which it should excrete. After the pet has learned to excrete on the sheet colored blue or the like, the sheet S for pet excretion of the invention, as shown in FIG. 1(A) or FIG. 1(B), which has a size conforming to a growth of the pet, is used.

The trained pet recognizes that a region colored blue or the like is the place on which it should excrete. On this occasion, even if the excretion place becomes an end part of the colored portion S1, since the non-colored portion S2 having an absorption function exists in the outer periphery portion of the colored portion S1, the urine or the like is surely absorbed by the absorbent body of the non-colored portion S2. Therefore, the urine or the like does not leak outside the sheet S for pet excretion. It is preferable that the width of the non-colored portion S2, as shown in FIGS. 2(A) and 2(B), is 20 mm or more. More preferably, it is from 30 to 60 mm.

Especially, as shown in FIG. 2(B) and FIG. 3, if the non-colored portion S2 has a larger height than the colored portion S1 and, further, the step (i) is formed in the boundary part therebetween, a liquid absorption ability at the peripheral non-colored portion S2 becomes high. That is, since it becomes easy to absorb the urine or the like excreted on an end part of the colored portion S1 by the non-colored portion S2, the urine or the like becomes difficult to flow outside the sheet.

Further, in the invention, it is possible to stepwise change an area of the colored portion of the sheet in conformity with a growth of the pet.

Moreover, since the pet is different in its body size owing to difference in its kind or individual, it is preferable to use a sheet for pet excretion fitted to a respective body size.

As has been described in detail, in the sheet for pet excretion of the invention, it follows that, even if the pet excretes on an end part of the colored portion or on the noncolored portion, the excreted urine or the like is absorbed also by the non-colored portion. Therefore, the urine or the like is difficult to flow outside the sheet.

In the foregoing specification, the invention has been described in relation to preferred embodiments and many details have been set forth for the purpose of illustration. It will be apparent to those skilled in the art that the invention is susceptible to additional embodiments and that certain of the details described herein can be varied considerably without departing from the basic principles of the invention.

Further, 'comprises/comprising' when used in this specification is taken to specify the presence of stated features, integers, steps or components but does not preclude the presence or addition of one or more other features, integers, steps, components or groups thereof.

What is claimed is:

1. A sheet for pet excretion comprising a liquid permeable front face sheet, a liquid impermeable rear face sheet and an absorbent body interposed between the front face sheet and the rear face sheet, wherein a liquid absorbent region where the absorbent body exists has a colored portion positioned at the center thereof and a non-colored portion adjoining the colored portion so as to enclose a whole periphery of the colored portion.

2. A sheet for pet excretion according to claim 1, wherein:

the absorbent body comprising a first absorbent body which is colored and a second absorbent body which is non-colored, and the second absorbent body is overlaid on an outer periphery portion of the first absorbent body.

3. A sheet for pet excretion according to claim 2, wherein:

the front face sheet and the first absorbent body are pressure-molded at least at the colored portion of the liquid absorbent region, to thereby form a step on the front face sheet at a boundary part between the first absorbent body and the second absorbent body.

4. A sheet for pet excretion according to claim 3, wherein:

the first absorbent body is composed of an absorbent core and an absorbent paper covering a surface of the absorbent core, and at least one of the absorbent core and the absorbent paper is colored, thereby making it possible to see the color through the front face sheet.

* * * * *